Figure 1:
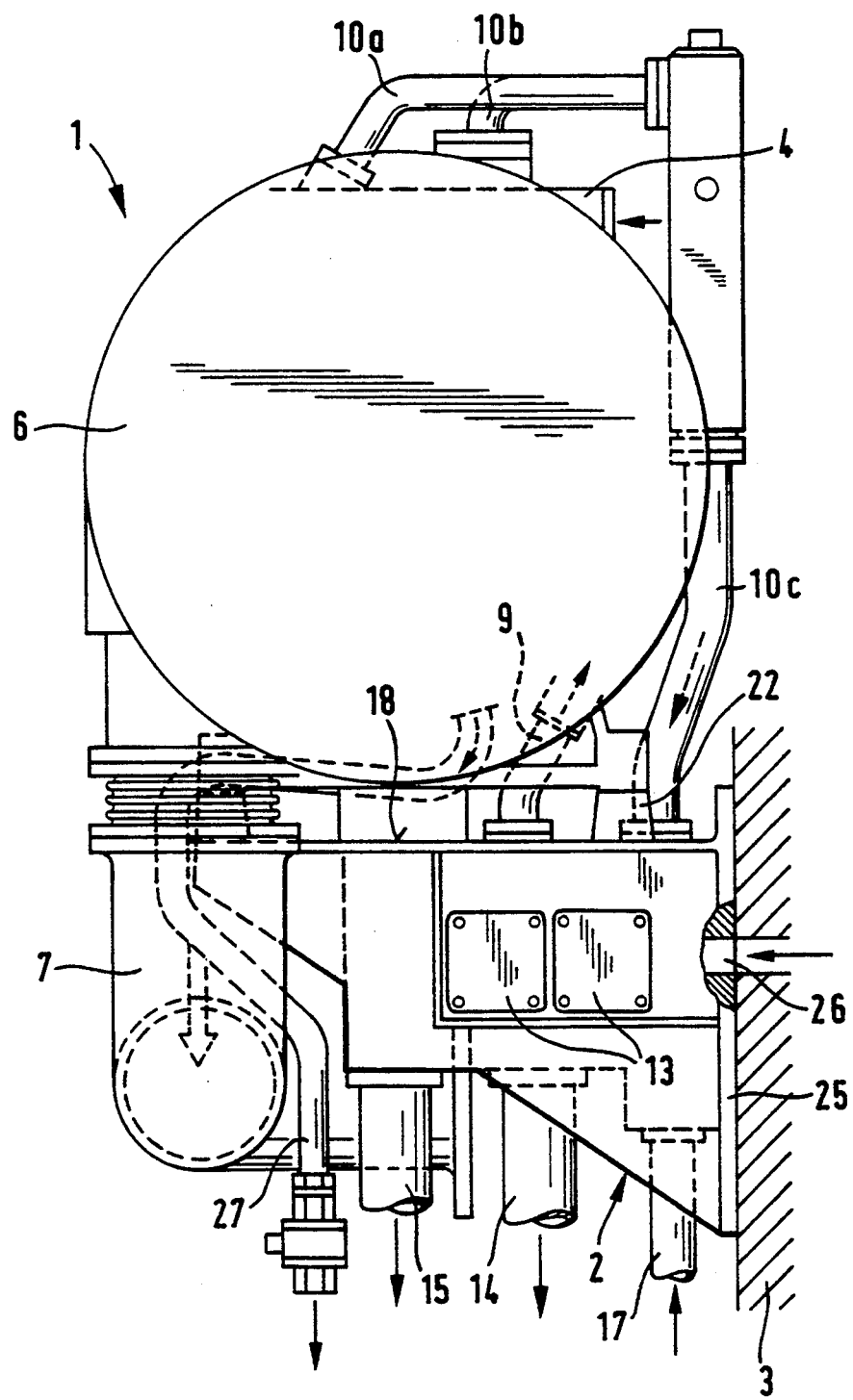

United States Patent [19]

Nikula et al.

[11] Patent Number: 5,392,604
[45] Date of Patent: Feb. 28, 1995

[54] SUPPORT AND COOLING ARRANGEMENT FOR A TURBOCHARGER

[75] Inventors: Arto Nikula, Merikaarto; Sami Koivikko, Vaasa, both of Finland

[73] Assignee: Wartsila Diesel International Ltd Oy, Helsinki, Finland

[21] Appl. No.: 183,045

[22] Filed: Jan. 18, 1994

[30] Foreign Application Priority Data

Jan. 27, 1993 [FI] Finland .................................. 930329

[51] Int. Cl.6 .............................................. F02B 37/00
[52] U.S. Cl. ................................................... 60/605.3
[58] Field of Search ........................... 60/605.1, 605.3; 123/41.31

[56] References Cited

U.S. PATENT DOCUMENTS

| | | | |
|---|---|---|---|
| 4,561,387 | 12/1985 | Korkemeier et al. | 60/605.3 |
| 4,583,367 | 4/1986 | Kapfer et al. | 60/605.3 |
| 4,716,735 | 1/1988 | Ruf et al. | 60/605.3 |

Primary Examiner—Michael Koczo
Attorney, Agent, or Firm—Smith-Hill and Bedell

[57] ABSTRACT

The invention relates to a support and cooling arrangement for a turbocharger apparatus (1) in a big diesel engine. It comprises a uniform body part (2) supported to the engine block (3), provided with a planelike bracket base (18) for supporting the turbocharger apparatus (1) and including a first cooling water duct (11), through which cooling water is arranged to be fed into the turbocharger apparatus (1), and a second cooling water duct (12), through which cooling water is arranged to be led away from the turbocharger apparatus (1). The planelike bracket base (18) includes' connecting openings (19, 20, 21) to the said first (11) and said second (12) cooling water ducts. In addition the arrangement comprises thermostatic valve means (13) arranged in the body part (2) in connection with the said second cooling water duct (12) and which, on the basis of the temperature of the cooling water coming out (10) from the turbocharger apparatus (1), is arranged to lead the cooling water on the one hand for recirculation (14) and on the other hand for cooling (15).

14 Claims, 4 Drawing Sheets

SUPPORT AND COOLING ARRANGEMENT FOR A TURBOCHARGER

The invention relates to a support and cooling arrangement for a turbocharger apparatus in a big diesel engine.

A big diesel engine refers here to such an engine that is applicable for example for main or auxiliary engine for ships or for thermal power stations. According to the known technique the brackets for a turbocharger in this kind of engines have usually been made of welded structures, whereby it has been difficult to include possible additional functions to them. As it has not been possible to integrate parts and different functions especially relating to the cooling of the turbocharger to the bracket structure as its stationary part, the number of elements and pipe joints needed has been great. As a result of this manufacturing and assembling of the brackets has been laborious and time consuming. In addition the tightness of numerous Joints causes uncertainty, because the vibrations, caused by the engine, stress the piping, joints and supporting structures.

An aim of the invention is to create a new supporting arrangement for a turbocharger from which the drawbacks mentioned above have essentially been eliminated. A further aim of the arrangement is especially to integrate different additional functions to the structure and in that way to reduce the number of different elements, which makes the assembling easier and is advantageous in view of space requirements. A still further aim is expressly to improve the structural reliability of the support and to prevent more effectively transmission of engine vibration to the structures and in that way to reduce the risk factors caused by that.

The aims can be met with an arrangement which comprises a uniform body part supported to the engine block, provided with a planelike bracket base for supporting the turbocharger apparatus and including a first cooling water duct, through which cooling water is arranged to be fed into the turbocharger apparatus, and a second cooling water duct, through which cooling water is arranged to be led away from the turbocharger apparatus. The planelike bracket base includes connecting openings to the said first and said second cooling water ducts. In addition the arrangement comprises thermostatic valve means arranged in the body part in connection with the said second cooling water duct and which, on the basis of the temperature of the cooling water coming out from the turbocharger apparatus, is arranged to lead the cooling water on the one hand for recirculation and on the other hand for cooling. In this way the components required for the cooling of the turbocharger apparatus have been essentially integrated to a uniform supporting structure which substantially reduces the number of needed parts and joints and at the same time improves the reliability of structure.

Integration can be further developed so that the body part comprises a duct for leading the cooling water supplied from the engine block into said second cooling water duct upstream of the said thermostatic valve means. In addition the said first cooling water duct can be arranged to branch inside the body part into two separate ducts so that one duct is arranged to lead cooling water into the inlet chamber provided in the turbocharger apparatus for the exhaust gases and the other duct into an outlet chamber in the turbocharger apparatus for the exhaust gases respectively.

The bracket base can further include a number of supporting elements extending from the bracket base and to which the turbocharger apparatus is fixed so that the turbocharger apparatus is situated at a distance from the planelike surface of the bracket base. The solution forwards maintenance actions and cleaning of the turbocharger apparatus especially if a washing device for the turbocharger apparatus is arranged to the body part to be a stationary part thereof. The washing device includes an outlet opening located in the said bracket base.

The body part comprises with advantage also a planelike flange member, which is located substantially perpendicularly with respect to the said bracket base and by means of which the body part is arranged to be fixed to the engine block. In this case the flange member can also comprise an inlet opening for feeding the cooling water from the engine block to the body part.

The vibrations caused by the engine can most advantageously be damped so that the body part with its ducts constitutes a uniform piece of casting.

Figure 2:
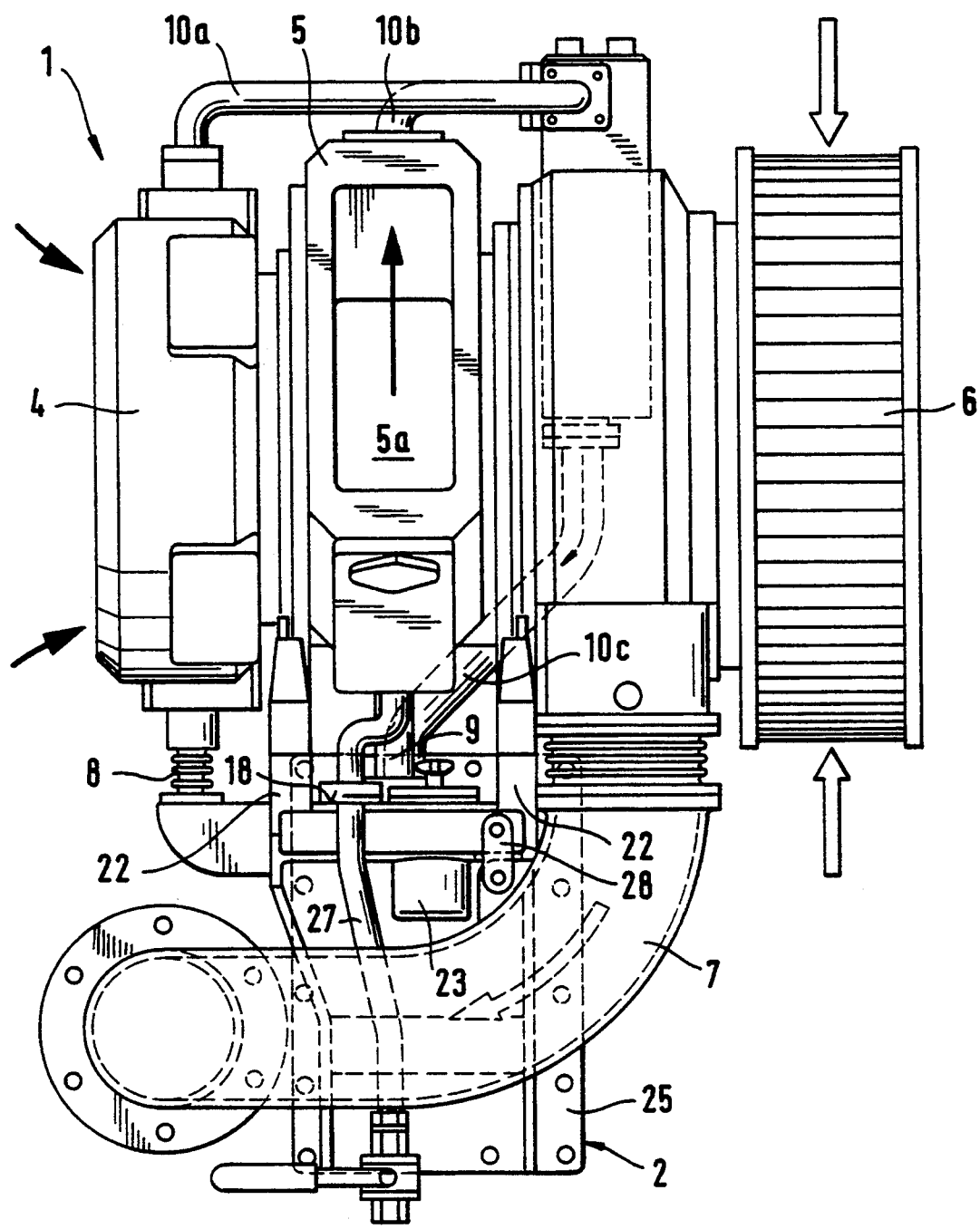
Figure 3:
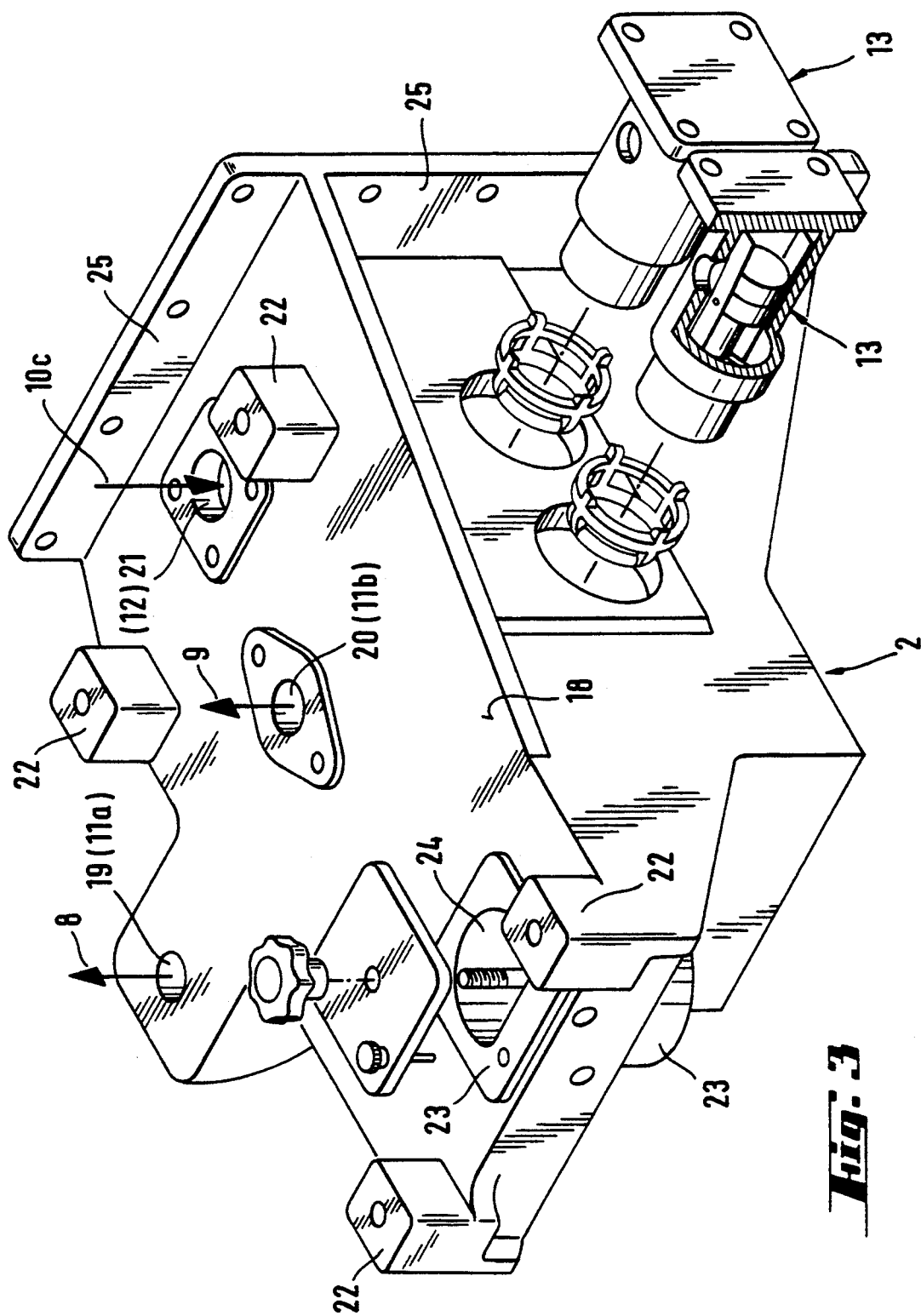
Figure 4:
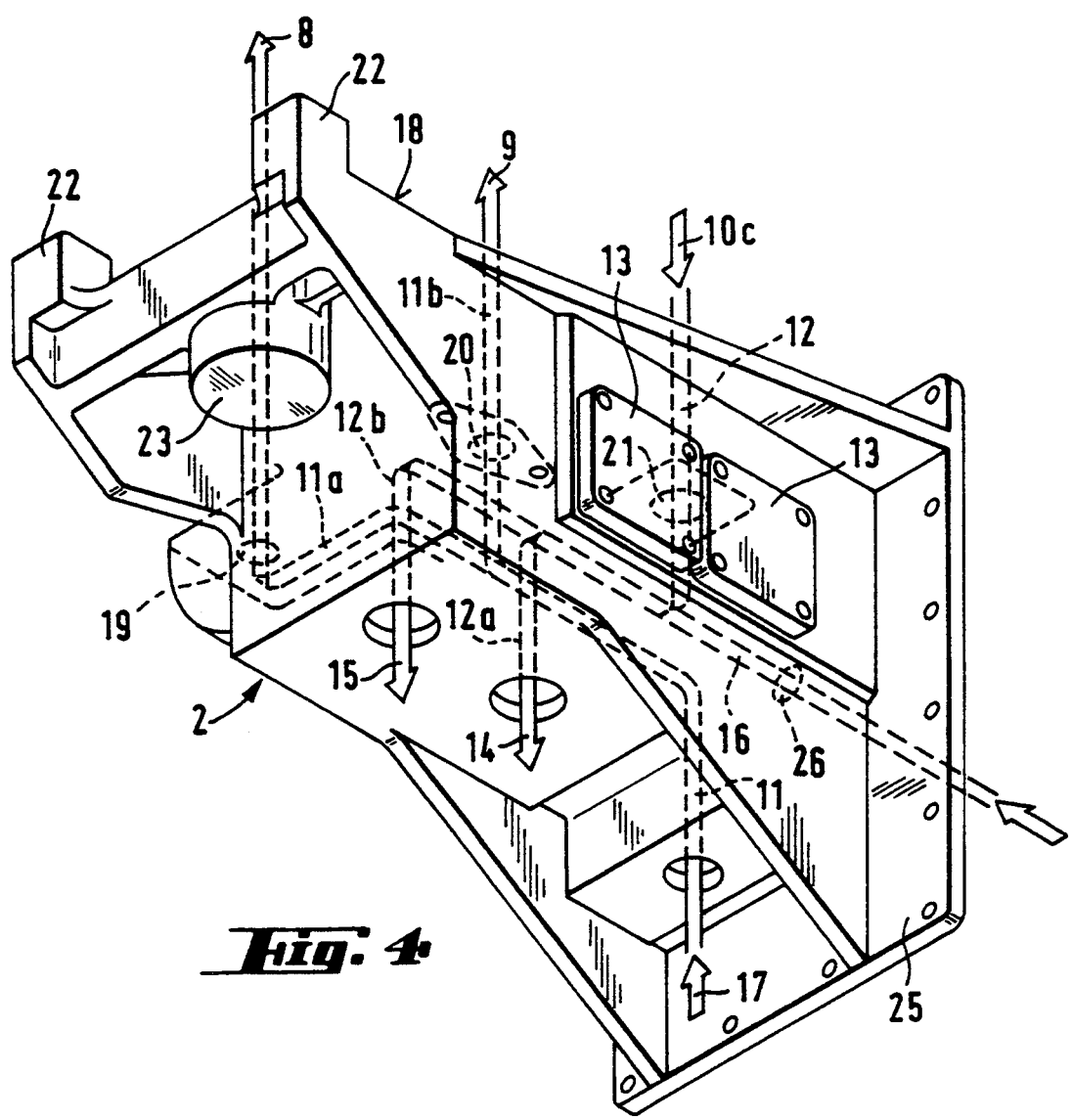

The invention will now be further described, by way of example, with reference to the accompanying drawings, in which FIG. 1 shows a support and cooling arrangement for a turbo apparatus according to the invention as installed and as a side view, FIG. 2 shows the arrangement of FIG. 1 as a front view, FIG. 3 shows a body part of the bracket included in the arrangement of FIG. 1, FIG. 4 shows the body part of FIG. 3 seen from another direction and provided with arrows representing cooling water ducts included in the body part and cooling water flows led therethrough.

In the drawings 1 indicates a turbocharger apparatus, known per se, which is to be connected to a diesel engine and which includes an inlet chamber 4 for exhaust Gases, into which the exhaust Gases coming from the engine are led, and an outlet chamber 5 for exhaust Gases, from which the exhaust Gases are led away from the turbo through an opening 5a in connection with the chamber 5. The charge air is sucked into the turbocharger through a suction unit or a filter 6 and is fed into the engine by means of a not-shown compressor through a pipe 7.

According to the invention the support arrangement of the turbocharger includes a body part 2 which supports the turbocharger 1 and which is fixed to an engine block 3 by means of flange element 25. The body part 2 includes a first cooling water duct 11 which leads the cooling water fed from the not-shown cooling water pump by means of a pipe 17 further through a duct branch 11a, a connecting opening 19 and a pipe 8 to the inlet chamber 4 for exhaust gases in the turbocharger and through a duct branch 11b, a connecting opening 20 and a pipe 9 to the outlet chamber 5 for exhaust gases in the turbo charger. From the turbocharger 1 the cooling water is led out through pipes 10a, 10b and 10c and through a connecting opening 21 in the body part 2 to be fed into a second cooling water duct 12 included in the body part 2. The body part 2 includes also thermostatic valve means 13 which on the basis of the temperature of the cooling water feed the cooling water on the one hand through a duct branch 12a and a pipe 14 connected to the body part 2 into the said cooling water pump for recirculation, and on the other hand through a duct branch 12b and a pipe 15 connected to the body part 2 into a not shown cooler before recirculation through the cooling water pump. The thermostatic valve means 13 can comprise one or more thermostatic valves with their parts. The embodiment of the figures includes two thermostatic valves, by means of which it is possible to provide more accurate control for the cooling water flow.

The body part 2 includes also a duct 16 connected to the cooling water duct 12 and arranged in connection with the cooling water ducts of the-engine block 3 through an inlet opening 26 so that the thermostatic valve means 13 control also the circulation of the Cooling water led from the engine block on the basis of the temperature according to need.

As particularly apparent from the FIG. 3 the body part 2 comprises a planelike bracket base 18, in which the connection openings 19, 20 and 21 for the cooling water pipes 8, 9 and 10c to be connected to the turbocharger are located. The bracket base 18 includes also supporting elements 22, to which the turbocharger apparatus 1 is fixed for example by means of bolts. Thereby the pipe joints remain advantageously in sight so that their condition can be monitored and they can be maintained according to need.

By manufacturing the body part 2 with its ducts as a uniform piece of casting the vibrations caused by the engine can be effectively damped. When cooling water ducts providing cooling for the turbocharger 1 are integrated to the body part 2 serving as a bracket, a solution is achieved that is advantageous from the viewpoint of space requirements and installation. In addition it is more reliable from the viewpoint of the joints because of damping of said vibrations.

It is clear that also other functions can be integrated to the body part 2 according to the invention, and it can be used on the whole to support and sustain different elements and pipes. Thus, for example, the body part 2 can be provided in advance with fastening positions for detectors for temperature and pressure measurements of the cooling water. In the application example of the figures a washing apparatus 23, known per se, has been integrated to the body part 2 for washing the compressor included in the turbo apparatus. The washing apparatus 23 includes a container and a valve with its driving mechanism, and its outlet opening 24 is normally closed. Due to the integration to the body part 2 it is not necessary to build a separate bracket for the washing apparatus 23. An outlet pipe 27 for the wash water is shown in FIGS. 1 and 2 and it is supported to the body part 2 as well.

The FIG. 2 shows further a flange arrangement 28, by means of which the feed pipe 7 for the charge air is supported to the body part 2.

The invention is not limited to the embodiment shown, but several modifications are feasible within the scope of the attached claims.

We claim:

1. A support and cooling arrangement for a turbocharger apparatus (1) in diesel engine, comprising a uniform body part (2) which is supported to the engine block (3) and is provided with a planelike bracket base (18) for supporting the turbocharger apparatus (1) and includes a first cooling water duct (11), through which cooling water is arranged to be fed into the turbocharger apparatus (1), and a second cooling water duct (12), through which cooling water is arranged to be led away from the turbocharger apparatus (1), the planelike bracket base (18) including connecting openings (19, 20, 21) to the said first (11) and said second (12) cooling water ducts, the arrangement further comprising thermostatic valve means (13) arranged in the body part (2) in connection with the said second cooling water duct (12) and which, on the basis of the temperature of the cooling water coming out (10) from the turbocharger apparatus (1), is arranged to lead the cooling water on the one hand for recirculation (14) and on the other hand for cooling (15).

2. A support and cooling arrangement according to claim 1, the body part (2) comprising a duct (16) for leading cooling water supplied from the engine block (3) into said second cooling water duct (12) upstream of the said thermostatic valve means (13).

3. A support and cooling arrangement according to claim 2, wherein the body part (2) comprises a planelike flange member (25), which is located substantially perpendicularly with respect to the said bracket base (18) and by means of which the body part (2) is arranged to be fixed to the engine block (3), the flange member (25) comprising an inlet opening (26) for feeding the cooling water from the engine block (3) into the body part (2).

4. A support and cooling arrangement according to claim 1, wherein the said first cooling water duct (11) is arranged to branch inside the body part (2) into two separate ducts (11a, 11b) so that one duct (11a) is arranged to lead cooling water into an inlet chamber (4) provided in the turbocharger apparatus (1) for the exhaust gases and the other duct (11b) into an outlet chamber (5) in the turbocharger apparatus (1) for the exhaust gases respectively.

5. A support and cooling arrangement according to claim 1, wherein the bracket base (18) includes a number of supporting elements (22) extending from the bracket base and to which the turbocharger apparatus (1) is fixed so that the turbocharger apparatus (1) is located at a distance from the planelike surface of the bracket base (18).

6. A support and cooling arrangement according to claim 5, wherein a washing device (23) for washing a compressor of the turbocharger apparatus (1) is arranged to the body part (2) to be a stationary part thereof, the washing device (23) including an outlet opening (24) located in the said bracket base (18).

7. A support and cooling arrangement according to claim 1, wherein the body part (2) with its ducts constitutes a uniform piece of casting.

8. A diesel engine comprising an engine block, a turbocharger apparatus, and a support and cooling arrangement for the turbocharger apparatus, the support and cooling arrangement comprising a uniform body part which is supported to the engine block and is provided with a planelike bracket base to which the turbocharger apparatus is supported, the uniform body part including a first cooling water duct, through which cooling water is arranged to be fed into the turbocharger apparatus, and a second cooling water duct through which cooling water is arranged to be led away from the turbocharger apparatus, the planeline bracket base including connecting passages to said first and second cooling water ducts, the arrangement further comprising thermostatic valve means arranged in the body part in connection with said second cooling water duct in which, on the basis of the temperature of the cooling water coming out from the turbocharger apparatus, is arranged to lead the cooling water on the one hand for recirculation and on the other hand for cooling.

9. A diesel engine according to claim 8, wherein the body part comprises a duct for leading cooling water supplied from the engine block into said second cooling water duct upstream of said thermostatic valve means.

10. A diesel engine according to claim 9, wherein the body part comprises a planelike flange member, which is located substantially perpendicularly with respect to said bracket base and by means of which the body part is fixed to the engine block, the flange member comprising an inlet opening for feeding the cooling water from the engine block into the body part.

11. A diesel engine according to claim 8, wherein the turbocharger apparatus has an exhaust gas inlet chamber and an exhaust gas outlet chamber and said first cooling water duct is arranged to branch inside the body part into two separate ducts so that one duct is arranged to lead the cooling water into the exhaust gas inlet chamber of the turbocharger apparatus and the other duct into the exhaust gas outlet chamber of the turbocharger apparatus.

12. A diesel engine according to claim 8, wherein the bracket base includes a number of supporting elements extending from the bracket base and to which the turbocharger apparatus is fixed so that the turbocharger apparatus is located at a distance from the planelike surface of the bracket base.

13. A diesel engine according to claim 12, wherein a washing device for washing a compressor of the turbocharger apparatus is arranged to the body part to be a stationary part thereof, the washing device including an outlet opening located in said bracket base.

14. A diesel engine according to claim 8, wherein the body part with its ducts constitutes a uniform piece of casting.

* * * * *